US010185665B2

(12) United States Patent
Rozario et al.

(10) Patent No.: US 10,185,665 B2
(45) Date of Patent: *Jan. 22, 2019

(54) TRANSLATION LOOKASIDE BUFFER

(71) Applicant: MIPS Tech, LLC, Santa Clara, CA (US)

(72) Inventors: Ranjit J. Rozario, San Jose, CA (US); Sanjay Patel, San Ramon, CA (US)

(73) Assignee: MIPS Tech, LLC, Santa Clara, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 15/824,613

(22) Filed: Nov. 28, 2017

(65) Prior Publication Data
US 2018/0089102 A1 Mar. 29, 2018

Related U.S. Application Data

(63) Continuation of application No. 14/715,117, filed on May 18, 2015, now Pat. No. 9,830,275.

(51) Int. Cl.
G06F 12/10 (2016.01)
G06F 12/1027 (2016.01)
G06F 12/0844 (2016.01)
G06F 12/1045 (2016.01)
G06F 12/1009 (2016.01)

(52) U.S. Cl.
CPC ...... G06F 12/1027 (2013.01); G06F 12/0844 (2013.01); G06F 12/1009 (2013.01); G06F 12/1054 (2013.01); G06F 2212/652 (2013.01); G06F 2212/684 (2013.01); Y02D 10/13 (2018.01)

(58) Field of Classification Search
CPC .... G06F 9/45558; G06F 9/455; G06F 12/109; G06F 2212/684; G06F 12/145; G06F 12/10; G06F 12/1045; G06F 12/1054; G06F 12/1009; G06F 12/0866; G06F 12/0897; G06F 12/00; G06F 12/08
USPC ........................................................ 711/207
See application file for complete search history.

(56) References Cited

U.S. PATENT DOCUMENTS 5,701,432 A 12/1997 Wang
5,854,761 A 12/1998 Patel
5,928,352 A 7/1999 Gochman
(Continued)

Primary Examiner — Shawn X Gu
Assistant Examiner — Jean C Edouard
(74) Attorney, Agent, or Firm — Adams Intellex, PLC

(57) ABSTRACT

Embodiments disclosed pertain to apparatuses, systems, and methods for Translation Lookaside Buffers (TLBs) that support visualization and multi-threading. Disclosed embodiments pertain to a TLB that includes a content addressable memory (CAM) with variable page size entries and a set associative memory with fixed page size entries. The CAM may include: a first set of logically contiguous entry locations, wherein the first set comprises a plurality of subsets, and each subset comprises logically contiguous entry locations for exclusive use of a corresponding virtual processing element (VPE); and a second set of logically contiguous entry locations, distinct from the first set, where the entry locations in the second set may be shared among available VPEs. The set associative memory may comprise a third set of logically contiguous entry locations shared among the available VPEs distinct from the first and second set of entry locations.

16 Claims, 7 Drawing Sheets

(56) References Cited

U.S. PATENT DOCUMENTS

| | | | |
|---|---|---|---|
| 6,256,709 B1 | 7/2001 | Patel | |
| 7,003,630 B1* | 2/2006 | Kissell | G06F 12/0815 |
| | | | 709/201 |
| 7,017,025 B1* | 3/2006 | Kissell | G06F 12/10 |
| | | | 707/999.201 |
| 8,180,998 B1 | 5/2012 | Maher | |
| 8,738,860 B1 | 5/2014 | Griffin | |
| 2004/0024986 A1 | 2/2004 | Devereux | |
| 2004/0044872 A1 | 3/2004 | Scott | |
| 2004/0268071 A1 | 12/2004 | Khan | |
| 2005/0044340 A1* | 2/2005 | Sheets | G06F 12/1036 |
| | | | 711/206 |
| 2005/0055528 A1 | 3/2005 | Arimilli | |
| 2006/0259734 A1* | 11/2006 | Sheu | G06F 12/1036 |
| | | | 711/203 |
| 2007/0101067 A1 | 5/2007 | Shafi | |
| 2007/0283123 A1* | 12/2007 | Vick | G06F 12/0284 |
| | | | 711/207 |
| 2007/0283125 A1* | 12/2007 | Manczak | G06F 11/3466 |
| | | | 711/207 |
| 2008/0172524 A1 | 7/2008 | Singh et al. | |
| 2008/0282058 A1* | 11/2008 | Maher | G06F 9/30167 |
| | | | 712/7 |
| 2009/0070545 A1 | 3/2009 | Stecher | |
| 2010/0106938 A1* | 4/2010 | Kimura | G06F 12/1027 |
| | | | 711/207 |
| 2010/0250869 A1 | 9/2010 | Adams et al. | |
| 2010/0318763 A1* | 12/2010 | Singh | G06F 12/1027 |
| | | | 711/207 |
| 2011/0185125 A1 | 7/2011 | Jain | |
| 2012/0079164 A1 | 3/2012 | Hakewill | |
| 2012/0079479 A1* | 3/2012 | Hakewill | G06F 9/45558 |
| | | | 718/1 |
| 2012/0096226 A1 | 4/2012 | Thompson | |
| 2012/0151149 A1 | 6/2012 | Dubrovin | |
| 2012/0226871 A1 | 9/2012 | Cantin | |
| 2012/0331265 A1 | 12/2012 | Rozario | |
| 2013/0132702 A1 | 5/2013 | Patel | |
| 2013/0173882 A1* | 7/2013 | Bhowmik | G06F 12/1036 |
| | | | 711/207 |
| 2014/0006681 A1* | 1/2014 | Chen | G06F 12/1027 |
| | | | 711/3 |
| 2015/0089116 A1 | 3/2015 | Chin et al. | |

\* cited by examiner

300

| 310 TLB Entry Number | 320 TLB Allocation |
|---|---|
| Entry 575<br><br>Entry 448 | 333<br><br>FTLB Way 3: 128 Entries |
| Entry 447<br><br>Entry 320 | 332<br><br>FTLB Way 2: 128 Entries |
| Entry 319<br><br>Entry 192 | 331<br><br>FTLB Way 1: 128 Entries |
| Entry 191<br><br>Entry 64 | 330<br><br>FTLB Way 0: 128 Entries |
| Entry 63<br><br>Entry 0 | (220, 230-0, 230-1, 230-2, 230-3)<br>VTLB: 64 Entries |

210 spans Entry 64 through Entry 575; 225 spans Entry 0 through Entry 63.

| 310<br>TLB Entry Number | 320<br>TLB Allocation |
|---|---|
| Entry 575<br><br>Entry 64 | {330, 331, 332, 333}<br>Shared FTLB |
| Entry 63<br><br>Entry 32 | 220<br>Shared VTLB |
| Entry 31<br><br>Entry 24 | 230-3<br>Private VTLB 3 |
| Entry 23<br><br>Entry 16 | 230-2<br>Private VTLB 2 |
| Entry 15<br><br>Entry 8 | 230-1<br>Private VTLB 1 |
| Entry 7<br><br>Entry 0 | 230-0<br>Private VTLB 0 |

210 spans the Shared FTLB range; 225 spans the VTLB ranges.

| 310 TLB Entry Number | | 510 VPE 0 Logical Entry number | 511 VPE 1 Logical Entry number | 512 VPE 2 Logical Entry number | 513 VPE 3 Logical Entry number |
|---|---|---|---|---|---|
| Entry 575 | 210 | Index 551 | Index 551 | Index 551 | Index 551 |
| Entry 64 | | Index 40 | Index 40 | Index 40 | Index 40 |
| Entry 63 | 220 | Index 39 | Index 39 | Index 39 | Index 39 |
| Entry 32 | | Index 8 | Index 8 | Index 8 | Index 8 |
| Entry 31 | 230-3 | Not available | Not available | Not available | Index 7 |
| Entry 24 | | | | | Index 0 |
| Entry 23 | 230-2 | Not available | Not available | Index 7 | Not available |
| Entry 16 | | | | Index 0 | |
| Entry 15 | 230-1 | Not available | Index 7 | Not available | Not available |
| Entry 8 | | | Index 0 | | |
| Entry 7 | 230-0 | Index 7 | Not available | Not available | Not available |
| Entry 0 | | Index 0 | | | |

(225 spans entries 0–31)

FIG. 5

TRANSLATION LOOKASIDE BUFFER

FIELD

The subject matter disclosed herein relates to processors, in general, and more specifically to memory management using translation lookaside buffers.

BACKGROUND

Memory Management Units (MMUs) on computer systems may map a virtual address space to a physical address space. The virtual address space represents the set of logical or virtual addresses that are made available to processes. For example, the virtual address space may be divided into pages and the virtual address may be represented by a virtual page number (e.g. some most significant bits of the virtual address) and an offset within the page (e.g. the remaining least significant bits of the virtual address). MMUs may maintain a page table, which correlates virtual page numbers with physical page numbers. By looking up a page table entry using the virtual page number as an index, the MMU may obtain a corresponding physical page number, which can be combined with the offset to obtain the physical address. To speed up page table lookups, some page table entries may be cached, for example, using an associative cache. The associative cache that holds page table entries is called a translation lookaside buffer (TLB). For example, page table entries in the TLB may be updated based on prior, current or expected memory access patterns.

Modern processors often provide hardware support virtualization and/or multi-threading. Virtualization refers to the creation of a simulated environment, such as a virtual processor, for programs called "guests". For example, a single processor core (the host) may appear as multiple processor cores to guests. The multiple processor cores are termed virtual cores or Virtual Processing Elements (VPEs). Virtualization is facilitated by a hypervisor, which provides a trusted execution environment by managing privileged resources and defining resource access and utilization policies for each guest. The hypervisor also manages memory and I/O privileges of the subsystems. Multi-threading refers to the parallel execution of code segments on a single processor core to improve overall throughput. For example, hardware resources, such as processor cycles may be shared among the threads so that one thread may continue executing while another has stalled thereby improving overall utilization and throughput. The use of virtualization and/or multi-threading may facilitate efficient use of hardware resources, lower costs and decrease power consumption relative to the use of multiple physical processor cores. Therefore, some modern processors may support both virtualization and multi-threading.

However, the use of multithreading and/or virtualization often results in inefficient use of resources such as caches or TLBs, which can then become bottlenecks that degrade performance. Therefore, some disclosed embodiments present efficient techniques for TLB use in a variety of contexts.

SUMMARY

Disclosed embodiments pertain to a physical Translation Lookaside Buffer (TLB) comprising: a physical content addressable memory with variable page size entries. In some embodiments, the content addressable memory may comprise: a first set of logically contiguous entry locations, wherein the first set comprises a plurality of subsets and each subset in the first set comprises logically contiguous entry locations for exclusive use of a corresponding virtual processing element (VPE) in a plurality of available VPEs, and a second set of logically contiguous entry locations distinct from the first set, wherein the entry locations in the second set are shared among the available VPEs. In some embodiments, the TLB may further comprise: a physical set associative memory with fixed page size entries, the set associative memory comprising a third set of logically contiguous entry locations distinct from the first and second set of entry locations, wherein the third set of entry locations is shared among the available VPEs.

In another aspect, embodiments disclosed pertain to a processor configurable to support a plurality of available Virtual Processing Elements (VPEs), where the processor may comprise a Memory Management Unit (MMU). In some embodiments, the MMU may comprise wherein the MMU comprise a physical Translation Lookaside Buffer (TLB). The TLB may further comprise a physical content addressable memory with variable page size entries, wherein the first content addressable memory comprises: a first set of logically contiguous entry locations, wherein the first set comprises a plurality of subsets and each subset in the first set comprises logically contiguous entry locations for exclusive use of a corresponding virtual processing element (VPE) in the plurality of available VPEs, and a second set of logically contiguous entry locations distinct from the first set, wherein the entry locations in the second set are shared among the available VPEs. In some embodiments, the TLB may further comprise: a physical set associative memory with fixed page size entries, the set associative memory comprising a third set of logically contiguous entry locations distinct from the first and second set of entry locations, wherein the third set of entry locations is shared among the available VPEs.

In further aspect, a non-transitory computer-readable medium may comprise executable instructions to describe a physical Translation Lookaside Buffer (TLB), wherein the TLB may comprise a physical content addressable memory with variable page size entries, wherein the first content addressable memory comprises: a first set of logically contiguous entry locations, wherein the first set comprises a plurality of subsets and each subset in the first set comprises logically contiguous entry locations for exclusive use of a corresponding virtual processing element (VPE) in the plurality of available VPEs, and a second set of logically contiguous entry locations distinct from the first set, wherein the entry locations in the second set are shared among the available VPEs. In some embodiments, the TLB describe by the instructions may further comprise a physical set associative memory with fixed page size entries, the set associative memory comprising a third set of logically contiguous entry locations distinct from the first and second set of entry locations, wherein the third set of entry locations is shared among the available VPEs.

The disclosure also pertains to circuits, processors, apparatuses, systems, and computer-readable media embodying instructions that describe the embodiments. In some embodiments, a computer-readable medium may comprise instructions that describe a processor, a MMU and/or a TLB consistent with disclosed embodiments. For example, the descriptions may be provided in a hardware description language such as VHDL, Verilog, or any other hardware description language.

BRIEF DESCRIPTION OF THE DRAWINGS

FIG. 3 shows a table of entries in a TLB illustrating an example allocation of TLB entries between a Fixed Page size TLB (FTLB) and a Variable Page Size (VTLB) in a manner consistent with disclosed embodiments.

FIG. 4 shows a table of entries in a TLB illustrating an example allocation of TLB entries between an FTLB and a VTLB for a multi-threaded environment in a manner consistent with disclosed embodiments.

FIG. 5 shows a table illustrating an exemplary mapping between TLB entry numbers and corresponding logical entry numbers used by threads/VPEs.

DETAILED DESCRIPTION

The detailed description set forth below in connection with the appended drawings is intended as a description of some exemplary non-limiting embodiments and various other embodiments may be practiced and are envisaged as would be apparent to one of skill in the art. Embodiments described are provided merely as examples or illustrations of the present disclosure. The detailed description includes specific details for the purpose of providing a thorough understanding of the present disclosure. However, it will be apparent to those skilled in the art that the present disclosure may be practiced without one or more of these specific details. In some instances, well-known structures and devices are not shown in block diagram form in order to avoid obscuring the concepts of the present disclosure. Acronyms and other descriptive terminology may be used merely for convenience and clarity and are not intended to limit the scope of the disclosure. In general, disclosed embodiments may be implemented using some combination of hardware, firmware, and software. Further, in some embodiments, a computer-readable medium may comprise instructions that describe a processor and/or a FPU, and/or a MMU and/or a TLB consistent with disclosed embodiments. For example, the descriptions may be provided in a hardware description language such as VHDL, Verilog, or any other hardware description language.

Figure 1:
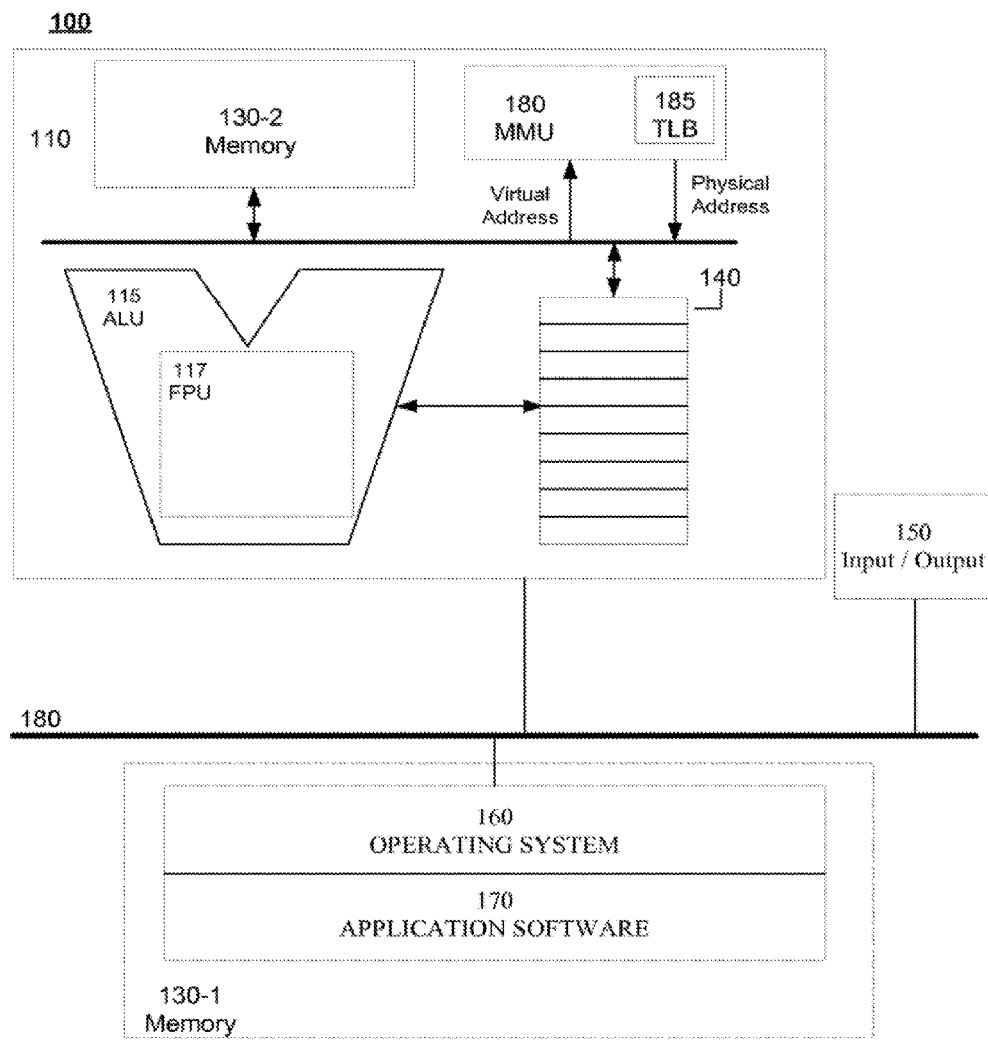
FIG. 1 shows a simplified schematic block diagram illustrating certain exemplary features of a computer system including a processor capable of performing various operations, including mathematical, logical and memory management operations.

FIG. 1 shows a simplified schematic block diagram illustrating certain exemplary features of a computer system 100 including a processor 110 capable of performing various operations, including mathematical, logical and memory management operations. As shown in FIG. 1, computer system 100 may further include Input-Output (I/O) devices 150 such as a keyboard, mouse, touchscreens, pens, displays, speakers, sensors, multi-media devices, printers etc. Processor 110, I/O devices 150 and other system components may be coupled using bus 180. Memory 130-1 may also be coupled to the bus 180. Memory 130-1 may store operating system 160 and application software 170, which may be loaded into memory 130-2 during operation of computer system 100.

In some embodiments, processor 110 may include Arithmetic Logic Unit 115 and register file 140, and memory 130-2. ALU 115 may be capable of performing arithmetic operations, including addition/subtraction, multiplication, division, fused multiplication-addition, square root, reciprocals, reciprocal square roots, transcendental functions, etc of integer, fixed point and/or floating point numbers on operands in register file 140. In general, processor 110 may include several additional functional units, such as additional ALUs 115, which may include integer units, floating point units (FPUs) 117. Processor 110 may also include external bus interface units, clock, pipelined execution units, scheduling units, clocks, and/or other support logic. Many of these functional units have been omitted in FIG. 1 merely to simplify discussion. Processor 110 may be incorporated in a variety of electrical, electronic or electro-mechanical devices along with one or more additional components.

In some embodiments, ALU 115 may include FPU 117, which may be used to perform floating point operations. FPU 117 may comprise one or more floating point execution units (FPXUs), which may be used to various perform floating point (FP) operations such as add, subtract, multiply, divide, multiply-add, square root, reciprocal, reciprocal square root, transcendental function computation, etc.

Processor 110 may be implemented using a combination of hardware, firmware, and software. In general, processor 110 may represent one or more circuits configurable to perform computations, including floating point operations in a manner consistent with disclosed embodiments. Processor 110 may be implemented within one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, embedded processor cores, integrated circuits, electronic devices, other electronic units designed to perform the functions described herein, or a combination thereof In some embodiments, portions of techniques disclosed herein may also be implemented using firmware and/or software.

As used herein, the term "memory" is used to refer to any type of long term, short term, volatile, nonvolatile, or other memory and is not to be limited to any particular type of memory or number of memories, or type of physical media upon which memory is stored. In some embodiments, memories 130-1 and 130-2 (collectively referred to as memory 130) may hold instructions and/or data to facilitate operations performed by processor 100. For example, instructions/data may be loaded into memory 130-1 and/or register file 140 from memory 130-2 for use by ALU 115. For example, the instructions received may pertain to a floating point operations, including addition, subtraction, multiplication, division, fused multiply-add, square root, reciprocal and other operations executed by ALU 115 and the results of the operation may be stored in register file 140 and in memory 130-2. In some embodiments, memory 130 may also include a Read Only Memory (ROM) or other non-volatile memory, which may be used to store microcode to facilitate performance of one or more operations by processor 110.

In some embodiments, memory 130 may include a hierarchy of memories, such as, for example, one or more cache memories, a primary memory and/or a secondary memory. For example, memory 130-2, which may be primary memory for system 100, may represent any data storage mechanism such as, but not limited to, Random Access Memory (RAM) including Static RAM (SRAM), Dynamic RAM (DRAM).

Secondary memory may include, for example, some of the same or similar type of memories as primary memory and/or one or more data storage devices or systems, such as, for example, flash/USB memory drives, memory card drives, disk, drives, optical disc drives, tape drives, solid state memory drives, etc. In certain implementations, secondary memory may be operatively receptive of, or otherwise configurable to couple to a computer-readable medium in a removable media drive (not shown in FIG. 1) coupled to processor 110.

Memory 130, which may be managed by MMU 180, may also include several cache memories. For example, memory 130 may include an instruction and/or data cache. Cache/primary memory may include, for example, content addressable memories (CAM), set associative memories, a random access memory (RAM), etc.

In some embodiments, MMU 180 may include TLB 185. As shown in FIG. 1, MMU 180 may map virtual addresses to physical addresses using TLB 185. In some embodiments, TLB 185 may maintain a cache of mappings between virtual addresses and physical addresses, or more generally, between addresses in one address space and addresses in another address space. When provided with a virtual address (or an address in a first address space), the TLB may return a corresponding physical address (or a corresponding address in a second address space).

For example, MMU 180 may maintain a page table, which correlates virtual page numbers with physical page numbers. By looking up a page table entry using the virtual page number as an index, the MMU may obtain a corresponding physical page number. The terms "page table entry" or "entry" are used analogously herein. To speed up page table lookups, some page table entries may be cached in TLB 185. TLB entries may have a "page size", which refers to a contiguous block of memory occupied by a physical page. Thus, a physical page number output by TLB 185 (e.g. in response to an input virtual page number) may be combined with the offset to obtain an actual physical address location.

In some embodiments, TLB 185 may be implemented as content-addressable memory (CAM), where a CAM search key may be a virtual address (e.g. virtual page number) and search result may be a physical address (e.g. physical page number). A CAM may be viewed as a fully associative cache, so that each location in TLB 185 may be arbitrarily mapped to any page. When the searched address is present in the TLB, the CAM search yields a match quickly and a TLB "hit" occurs. The physical address (retrieved from TLB 185) corresponding to the searched virtual address may then be used to access memory 130.

On the other hand, a TLB "miss" occurs when the searched virtual address is not in the TLB. On a TLB miss, virtual to physical address translation proceeds by looking up a page table in a process called a page walk. The page walk is relative slow and may have a latency of several processor cycles because multiple memory locations may be read prior to computing a physical address corresponding to the virtual address. Typically, once a physical address corresponding to a virtual address has been determined by the page walk, the virtual to physical address mapping may be stored in TLB 185, which facilitates quicker subsequent access. A replacement algorithm may manage entries in the TLB by determining the storing, removal and/or swapping of TLB entries. In some embodiments, the replacement algorithm may manage TLB entries based on existing policies based on historical, current or expected memory access requests.

TLBs are also sometimes implemented using an n-way set associative cache, where a particular TLB entry can be located in any one of the n-ways. In an n-way set associative cache, each page table entry in main memory can go to any one of n places in the cache. In some embodiments, the n-way set associative cache may be implemented using Random Access Memory (RAM) such as Static RAM (SRAM). Fixed page sizes are often preferred when using set associative caches (such as an n-way cache).

With a "fixed page size", each entry in the TLB (or in a portion thereof) pertains to a page of the same size as any other page table entry. For example, one of a 4 kilobyte (KB), 8 KB, 16 KB, 32 KB, etc. page size may be used for a set associative cache so that each page table entry would then relate to page of the corresponding size. The size of the offset, which may be given by lower order bits in the virtual address, may change in accordance with the fixed page size selected. As indicated earlier, the offset is typically combined with the physical page number output by the TLB to obtain the complete physical address corresponding to the virtual address. Many processors use a fixed page size of 4 KB or 8 KB.

In instances where large or variable page sizes may be desirable, conventional schemes disfavor set associative caches. Moreover, set-associative caches are slower and limit flexibility. On the other hand, when implementing TLBs, CAMs are: (i) expensive both in terms of chip area and power consumption, and (ii) are typically small in size, thereby limiting their utility.

Some disclosed embodiments facilitate the use of a TLB, which may include a CAM that is used in conjunction with a set associative cache. For example, TLB 185 may be implemented using a CAM and an n-way set associative cache. Disclosed embodiments, which may use a TLB in combination of CAMs with set associative caches may provide high performance in a cost and power efficient manner. Embodiments disclosed herein also present efficient techniques for TLB use in a variety of contexts, including multi-threaded and/or virtualized environments.

Figure 2:
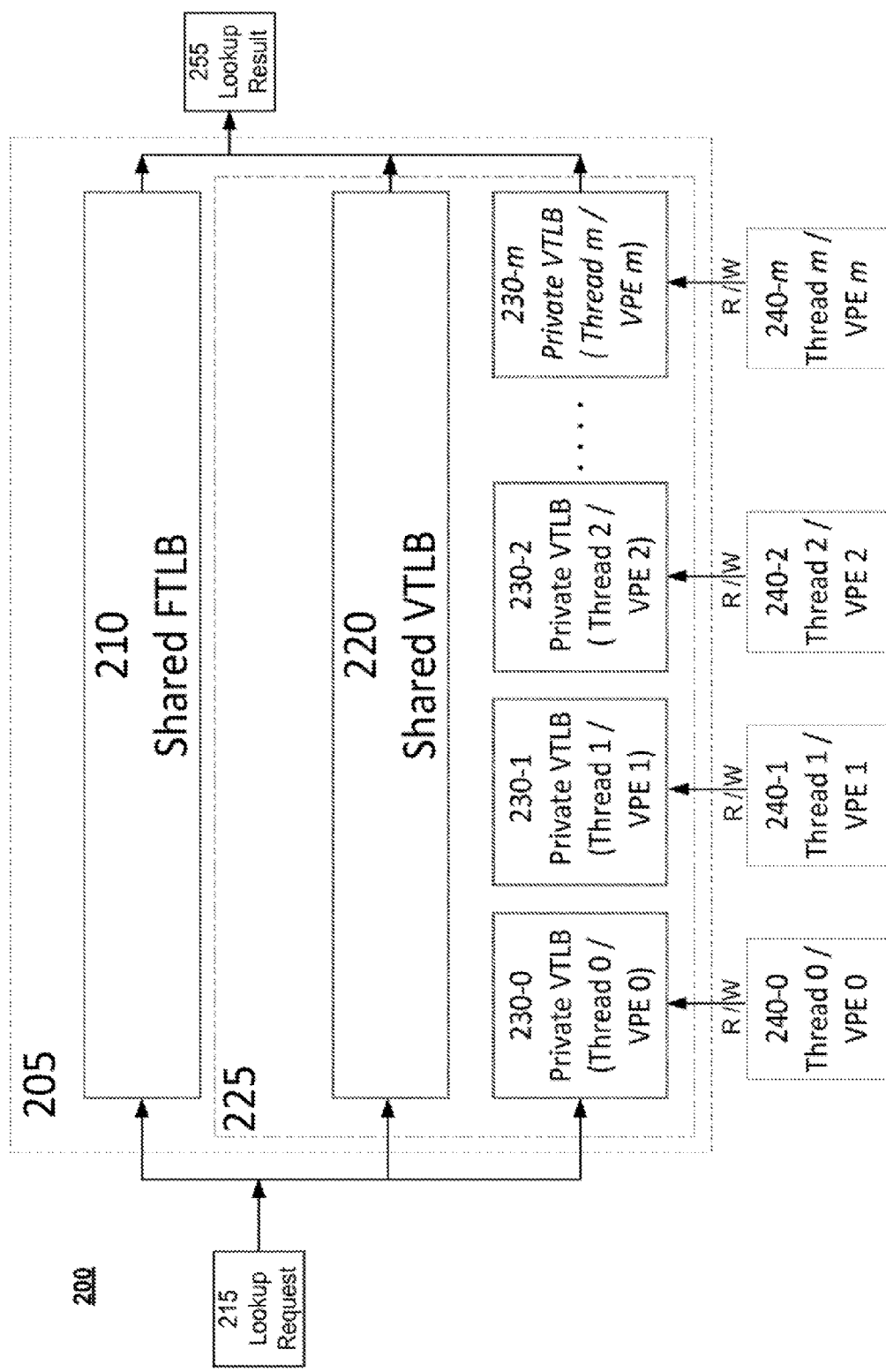
FIG. 2 shows a block diagram illustrating an exemplary division and allocation of a TLB between multiple threads/VPEs in a manner consistent with disclosed embodiments.

FIG. 2 shows a block diagram 200 illustrating an exemplary division and allocation of a TLB between multiple threads/VPEs in a manner consistent with disclosed embodiments. As shown in FIG. 2, TLB 205 may include a Fixed page size TLB (FTLB) 210 and/or a Variable page size TLB (VTLB) 225, portions of which may be shared between threads. The terms "Fixed" or "Variable," when used with TLBs, qualify the page size associated with page table entries in the TLB. The term "fixed" implies that, at any given time, page sizes do not vary between TLB entries, while "variable" implies that, at any given time, page sizes for TLB entries are not necessarily the same.

In a TLB, the number of page table entries may be viewed as the number of different virtual to physical mappings that the TLB can support at a point in time. Therefore, in a VTLB, each entry may have a different number of virtual address bits (in the virtual address) translated to a physical address. Thus, in some implementations, the TLB may contain or be provided with an indication of page size corresponding to an entry. The indication of page size may determine the number of virtual address bits that are translated to obtain a physical page or physical frame number.

In some embodiments, page sizes may be determined, at least in part, by the computer/operating system, configuration settings, and/or other parameters. In some embodiments, Shared FTLB 210, which may be implemented with SRAMs, may be larger than VTLB 225, which is implemented with CAMs. For example, one implementation of TLB 205 may have 512 FTLB entries and 64 VTLB entries. The term "VTLB" is used herein to refer to a CAM-based TLB with entries associated with variable page sizes, while the term "FTLB" is used herein to refer to a set-associative cache based TLB with entries associated with fixed page sizes.

In some embodiments, TLB 205 may include Shared FTLB 210, and VTLB 225. Further, VTLB 225 may include Shared VTLB 220 and Private VTLBs 230-0, 230-3, 230-2 . . . 230-$m$, where $m \geq 0$ is some integer and $m+1$ represents the number of threads/VPEs. Private VTLBs 230-0, 230-1, 230-2 . . . 230-$m$ are sometimes referred to collectively as Private VTLBs 230. Page sizes for each entry in Shared FTLB 210 may be fixed (e.g. set to some predetermined value), while page sizes in Shared VTLB 220 or Private VTLBs 230 may be variable. In some embodiments, Shared FTLB 210 and Shared VTLB 220 may be shared between threads 240-0, 240-1, 230-2 . . . 240-$m$.

As outlined earlier, many modern processors provide hardware support virtualization and/or multi-threading. Virtualization refers to the creation of a simulated environment, such as a virtual processor, for programs called "guests" by a program called a "root". For example, a single physical processor core (the host) may be made to appear as multiple processor cores to guests. The multiple processor cores are termed or virtual cores or Virtual Processing Elements (VPEs).

Virtualization is facilitated by a hypervisor, which provides a trusted execution environment by managing privileged resources and defining resource access and utilization policies for each guest. The hypervisor also manages memory and I/O privileges of the subsystems. Multi-threading refers to the parallel execution of code segments on a single processor core (physical or virtual/VPE) to improve overall throughput.

In many conventional systems, the hypervisor may also direct memory management by determining memory allocation to VPEs/threads and maintaining TLBs. Virtualized implementations also may provide for a guest to run unmodified. When run unmodified, the guest operating system and/or guest software may be run in a virtualized environment without modification. Thus, many virtualized environments also support virtualization and multi-threading. As one example, a set of hardware resources may be virtualized so that one or more "virtual cores" or VPEs are presented for use by guests. The hypervisor may schedule root and/or guest processes/process threads on the one or more virtual cores. The running of root and/or guest processes unmodified may be facilitated by hardware support for TLBs in such environments. For example, hardware may facilitate the ability of root/guests to direct the management of local TLBs, while ensuring separation between guests, resource efficiency, and compliance with overall system policies. Thus, embodiments disclosed herein also present efficient techniques for TLB use in a variety of contests, including multi-threaded and/or virtualized environments.

In some embodiments, Shared FTLB 210 and/or Shared VTLB 220 may be shared between root/guest processes/threads and/or VPEs in a virtualized environment. Further, each thread (or VPE) 230-$i$ may have exclusive read and write (R/W) access to Private VTLB 230-$i$, for $0 \leq i \leq m$.

In some embodiments, Shared VTLB 220 and Private VTLBs 230 may be implemented as a fully associative cache, whereas Shared FTLB 210 may be implemented as a set associative cache. In some embodiments, Shared FTLB 210 may be implemented using SRAM. In some embodiments, FTLB 210 may be implemented as one physical structure while VTLB 225 may be implemented as another physical structure.

In some embodiments, TLB lookup request 215 initiates the look up a given Virtual Address (VA) simultaneously to both FTLB 205 and VTLB 220. As shown in FIG. 2, when a page table look up request 205 is received (e.g. by MMU 180/TLB 205), from a thread i (or VPE i) one or more of Shared FTLB 210, Shared VTLB 220, Private VTLBs 230-$i$, may be searched simultaneously. If a TLB entry exists for the virtual address in the lookup request 205, then, lookup result 255 may be output (e.g. by MMU 180/TLB 205). Lookup result 255 may include a physical address corresponding to the virtual address in lookup request 205.

Accordingly, in some embodiments, TLB 205 may include VTLB 225, which may be implemented as physical content addressable memory with variable page size entries. In some embodiments, the content addressable memory may include two sets of logically contiguous entry locations. The first set of logically contiguous entry locations may include a plurality of subsets where each subset may include logically contiguous entry locations for exclusive use of a corresponding virtual processing element (VPE) in a plurality of available VPEs. For example, in some embodiments, Private VTLBs 230-0, 230-1, 230-2 . . . 230-$m$ may each form logically contiguous locations within VTLB 225 and may be exclusively accessible by VPEs 240-0, 240-1, 240-2 . . . 240-$m$, respectively. The second set of logically contiguous entry locations in the content addressable memory may be distinct from the first set and may be shared among the available VPEs. For example, Shared VTLB 220 may include logically contiguous entry locations, which may be shared between available VPEs 240-0, 240-1, 240-2 . . . 240-$m$. Further, in some embodiments, TLB 205 may include shared FTLB 210, which may be implemented as a physical set associative memory with fixed page size entries. In some embodiments, the set associative memory may include a third set of logically contiguous entry locations distinct from the first and second set of entry locations, wherein the third set of entry locations may be shared among the available VPEs. For example, Shared FTLB 210 may be may include logically contiguous entry locations, which may be shared between available VPEs 240-0, 240-1, 240-2 . . . 240-$m$.

FIG. 3 shows a table 300 of entries in a TLB (e.g. TLB 205) illustrating an example allocation 320 of TLB entries between an FTLB (e.g. FTLB 210) and a VTLB (e.g. VTLB 225) in a manner consistent with disclosed embodiments. As shown in FIG. 3, exemplary TLB 205 may include 576 logically contiguous entries, distributed between fully associative VTLB 225 and 4-way set associative FTLB 210. Further, logically contiguous entry numbers 64 through 575 may form part of an FTLB, such as Shared FTLB 210, while logically contiguous entries 0-63 may form part of VTLB 225. In some embodiments, entries 0-63 in VTLB 225 may be distributed between a shared VTLB (e.g. Shared VTLB 220) and private VTLBs (e.g. Private VTLBs 230). The term "physically contiguous" refers to memory locations that have adjacent physical addresses, while the term "logically contiguous" is used to refer to a sequence of memory locations that have adjacent logical addresses (e.g. adjacent virtual addresses or adjacent indexes). Logically contiguous addresses may or may not be physically contiguous.

Shared FTLB 210, shown as a four-way set associative cache in FIG. 3, may include four sets of 128 TLB entries, which include: (i) entry numbers 63-191, shown as "FTLB Way 0" 330; (ii) entry numbers 192-319, shown as "FTLB Way 1" 331; (iii) entry numbers 320-447 shown as "FTLB Way 2" 332; and (iv) entry numbers 448-575, shown as "FTLB Way 3" 333.

FIG. 4 shows table 400 of entries in a TLB (e.g. TLB 205) illustrating an example allocation 320 of TLB entries between an FTLB (e.g. FTLB 210) and a VTLB (e.g. VTLB 225) for a virtualized environment in a manner consistent with disclosed embodiments. As shown in FIG. 4, logically contiguous entry numbers 64 through 575 may form part of an FTLB, such as Shared FTLB 210. In some embodiments, entry number 64 through 575 may be allocated using a four-way set associative cache as indicated earlier in FIG. 3 between "FTLB Way 0" 330, "FTLB Way 1" 331, "FTLB Way 2" 332, and "FTLB Way 3" 333.

Further, as shown in FIG. 4, VTLB 225 may include 64 logically contiguous TLB entries numbered 0-63, which may be allocated as follows: (i) logically contiguous entry numbers 0-7 to "Private VTLB 0" 230-0; (ii) logically contiguous entry numbers 8-15, to "Private VTLB 1" 230-1; (iii) logically contiguous entry numbers 16-23 to "Private VTLB 2" 230-2; (iv) logically contiguous entry numbers 24-31 to "Private VTLB 3" 230-3; and logically contiguous entry numbers 32-63 to "Shared VTLB" 220. In some embodiments, in a multi-threaded environment, Private VTLB 0 230-0, Private VTLB 1 230-1, Private VTLB 2 230-2, and Private VTLB 3 230-3 may be used exclusively by Thread 0 240-0, Thread 1 240-1, Thread 2 240-2, and Thread 3 240-3, respectively. As another example, in a virtualized environment, with four Virtual Processing Elements (VPEs) given by VPE 0, VPE 1, VPE 2 and VPE 3, Private VTLB 0 230-0, Private VTLB 1 230-1, Private VTLB 2 230-2, and Private VTLB 3 230-3 may be used exclusively by VPE 0 240-0, VPE 1 240-1, VPE 2 240-2, and VPE 3 240-3, respectively.

As outlined earlier, VTLB 225, which may be implemented as a fully associative cache or CAM, may have a relatively small number of page entries. In some instances, the page sizes associated with entries in VTLB 225 may be variable. In some instances, VTLB 225 may facilitate page entries of the order of gigabyte or more in size.

In some implementations, the "wiring" of page entries in the CAM may be facilitated. The terms "wiring" or "wired entry" is used to describe entries in VTLB 225 that are not automatically managed by a replacement algorithm. For example, TLB entries may be facilitated, by at least two different instructions. A first instruction may cause the automatic placement of a TLB entry in the TLB. For example, a replacement algorithm may decide where the new entry gets placed in the TLB and/or which entry is removed from the TLB to accommodate the new entry. However, to prevent one or more entries torn being swapped out of the TLB by an automated algorithm, software may designate certain entries as "wired".

In some embodiments, one or more of VPE 0 240-0, VPE 1 240-1, VPE 2 240-2, and/or VPE 3 240-3 may designate one or more entries in Private VTLB 0 230-0, Private VTLB 1 230-1, Private VTLB 2 230-2, and Private VTLB 3 230-3, respectively, as wired. For example, a second instruction may be used to designate a TLB entry as wired. In some embodiments, the instruction may also indicate that the wired TLB entry reside at a specific TLB location. For example, thread i or VPE i may indicate that a new wired entry is to be placed at a "0" (zero) location in private VTLB 230-i. Thus, wired entries will be available to thread i or VPE i at the specified TLB location. In contrast, as outlined above, entries that are not wired may be managed by the replacement algorithm and may be swapped out to accommodate new entries in accordance with a current or existing replacement policy.

Thus, Private VTLB 230-i may be used to ensure that an entry placed by thread i or VPE i at a specified TLB location is not replaced or swapped out. On the other hand, entries in Shared VTLB 220 or Shared FTLB 210 may be replaced or swapped out as per the replacement policy in effect because no preservation is guaranteed for entries in Shared VTLB 220 or Shared FTLB 210. Further, in embodiments where (both root and guest) threads i or VPEs i each have a Private VTLB 230-i as well as R/W access to Shared VTLB 220 and/or Shared FTLB 210, then: (i) wired entries in VTLB 230-i are available to the root and each guest associated with VPE i; (ii) some random replacement entries are also available to the root and each guest in VTLB 230-i; (iii) some random replacement entries are also available to the root and guests in Shared FTLB 220; and (iv) thread i or VPE i cannot deny non-private TLB resources to a different thread j or VPE j, where i≠j.

FIG. 5 shows a Table 500 illustrating an exemplary mapping between TLB entry numbers 310 and corresponding logical entry numbers used by threads/VPEs. Specifically, Table 500 shows an exemplary mapping distributing 64 logically contiguous entries in VTLB 225 between 4 virtual cores (e.g. VPEs 240-0, 240-1, 240-2 and 240-3, not shown in FIG. 4), where 32 entries of the 64 VTLB entries are shared (e.g. in Shared VTLB 220 where the entries may be replaced in accordance with a replacement policy) and 8 VTLB entries are allocated exclusively to each virtual core (e.g. in Private VTLB's 230-0, 230-1, 230-2, and 230-3). In some embodiments, the entries available to allocate to each VPE/thread may be configured during startup and/or in hardware.

As shown in Table 500, indexes 0-7 for VPE 0 logical entry number 510 may correspond to entries 0-7 of TLB entry numbers 310, which may form part of Private VTLB 230-0. Similarly, indexes 0-7 for VPE 1 logical entry number 511 may correspond to entries 8-15 of TLB entry numbers 310, which may form part of Private VTLB 230-1. Further, indexes 0-7 for VPE 2 logical entry number 512 may correspond to entries 16-23 of TLB entry numbers 310, which may form part of Private VTLB 230-2. Finally, indexes 0-7 for VPE 3 logical entry number 513 may correspond to entries 24-31 of TLB entry numbers 310, which may form part of Private VTLB 230-3. As outlined above, in some embodiments, Private VTLBs 230-0, 230-1, 230-2 and 230-3 may be exclusive to threads/VPEs 240-0, 240-1, 240-2, and 240-3, respectively. Thus, as shown in Table 500, TLB entries 0-7 are unavailable to VPEs 1, 2, and 3; while TLB entries 8-15 are unavailable to VPEs 0, 2, and 3; TLB entries 16-23 are unavailable to VPEs 0, 1, and 3; and TLB entries 24-31 are unavailable to VPEs 0, 1, and 2.

Further, in the embodiment shown in FIG. 5, each of VPEs (or threads) 240-0, 240-1, 240-2, and 240-3 may use local indexes 8-39 to share access to entries 32-63 of TLB entry numbers 310, which may form part of Shared VTLB 220. TLB entries 64-575, which may form part of Shared FTLB 210, may correspond to local indexes 40-551 for each VPE/thread.

Thus, in some embodiments, a first set of indexed locations (e.g. indexes 0-7) for each VPE may correspond to distinct non-overlapping sets of TLB entries 310. Further, a second set of indexed locations (e.g. indexes 8-39) may correspond to a set of TLB entries in Shared VTLB 220. In addition, a third set of indexed locations may correspond to set of TLB entries in Shared FTLB 210.

In some embodiments, the proportion of VTLB 225 allocated to Private VTLBs 230 may be configurable, set at system startup and/or in hardware, and/or varied based on design, configuration, application, and/or other parameters. In some embodiments, the size of each private VTLB may not be equal. For example, the sizes of private VTLBs may be configurable, set at system startup and/or in hardware, and/or may be varied based on design, configuration, application, and/or other parameters. In some embodiments, the number of private VTLBs may not be equal to the number of threads/VPEs/cores. Further, the numbers of VPEs/threads and/or private VTLBs shown in the figures are merely illustrative and for explanatory purposes only. In general, the techniques and implementations disclosed may be applies to arbitrary numbers of VPEs/threads and/or private VTLBs in a manner consistent with disclosed embodiments.

In some embodiments, the mapping between VPE indexes or logical entries to the actual TLB entries may be performed by an address decoder, which may be fixed function or configurable. For example, in one implementation, when a new virtual core or VPE 240 is instantiated, the address decoder may be programmed to allocate entries (both private and shared) in VTLB 225 among the now-current number of cores/VPEs. Further, in some embodiments, cores/VPEs, on which the root executes, may have some portion of their respective private VTLB entries allocated for the root's wired entries.

Figure 6:
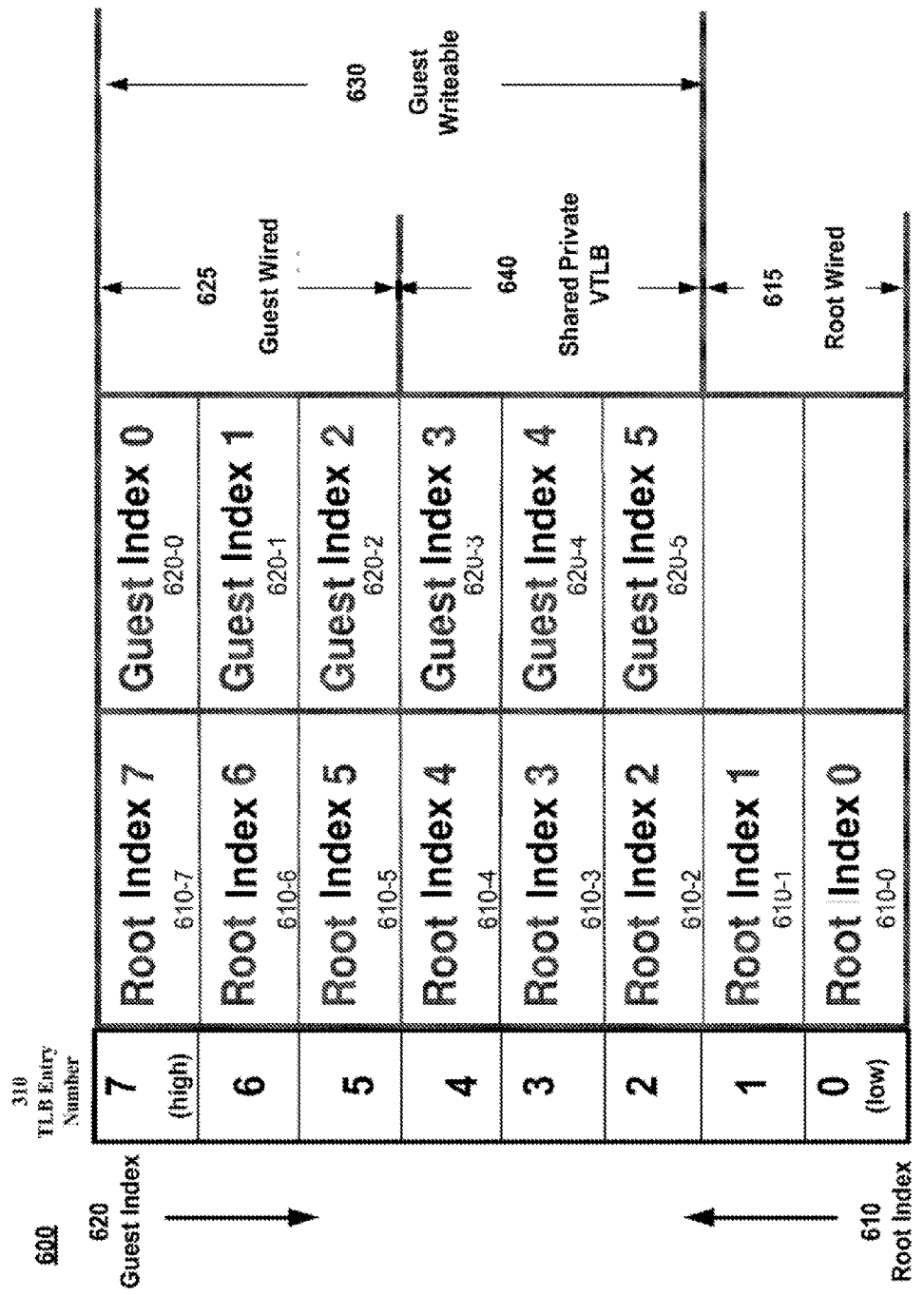
FIG. 6 shows an exemplary private VTLB with entries distributed between the root and guest.

FIG. 6 shows an exemplary private VTLB 600 with entries distributed between the root and guest. In some instances, exemplary private VTLB 600 may be one of Private VTLBs 230-0 through 230-3.

As shows in FIG. 6, Private VTLB 600 may include eight entries, which may be allocated between root and guest. In some instances, in addition to wired entries 625 for the guest, Private VTLB 600 may include wired entries 615 for the root. Thus, a portion of the available entries in Private VTLB 600 may be reserved for root wired entries 615. For example, root wired entries 615 may include Root Entry 0 610-0 and Root Entry 1 610-1. Further, as shown in FIG. 6, a portion of the available entries in Private VTLB 600 may be used by the guest. For example, Guest Wired Entries 625 may include Guest Entry 0 620-0, Guest Entry 1 620-1 and Guest Entry 2 620-2. In some embodiments, entries in Private VTLB 600, which are not wired, may be shared between root and guest. For example, both root and guest may have R/W access to Shared Private VTLB 640.

In some embodiments, entries by the root may be prioritized over entries by the guest in Private VTLB 600. For example, in some instances, the root may be able to use entire Private VTLB 600. As shown in FIG. 6, in some instances, Private VTLB 600 can include root entries 610-0 through 610-7, which may occupy entire Private VTLB 600. As one example, when a guest does not request wired entries, all of Private VTLB 600 may be available to the root. In some embodiments, access by the guest to Private VTLB 600 may be limited to Guest Writeable Portion 630, which may include Guest Wired entries 625 and Shared Private VTLB 640. Further, access to root wired portion 615 may not be available to the guest.

As one implementation, the root may set a number of wired root entries 615 in Private VTLB 600. The root may also set a maximum number of wired entries available to the guest. All remaining (not assigned as either root wired entries or guest wired entries) entries in Private VTLB 600 and entries in Shared VTLB 220 may be available to both root and guest. Further, entries in Shared FTLB 210 may also be available to both root and guest. In some embodiments, entries in Shared FTLB 210 may appear after the end of the entries in VTLB 225.

In some embodiments, root and guest indexes may grow in opposite directions relative to TLB entry numbers to decrease the possibility of root and guest entries colliding. For example, for a TLB entry k in a private VTLB of size s, the corresponding root index or corresponding logical root entry may also be k, while the corresponding guest entry may be (s−k−1). For Private VTLB 600, where s=8, VTLB entry 3 (k=3) may correspond to logical root entry 3 610-3 and logical guest entry 8−3−1=4 610-4. Thus, in some embodiments, the $0^{th}$ root and guest entries may be mapped to opposite ends of VTLB 600.

For example, if the logically contiguous entries in Private VTLB 600 correspond to Private VTLBs 230-0, then allocation of private VTLB entries to root and guest may be performed as shown in FIG. 6. As one example, a first group of logically contiguous entries may be allocated to the root sequentially starting with the lowest numbered TLB entry as the $0^{th}$ root index, and a second group of logically contiguous entries is allocated sequentially starting with the highest numbered TLB entry as the $0^{th}$ guest index. For example, as shown in FIG. 6, exemplary TLB entry 0 may correspond to Root Index/Entry 0 610-0, while exemplary TLB entry 7 may correspond to Guest Index/Entry 0.

In some embodiments, the allocations above may be reversed and a first group of logically contiguous entries may be allocated to the root sequentially starting with the highest numbered TLB entry as the $0^{th}$ root index, while a second group of logically contiguous entries is allocated sequentially starting with the lowest numbered TLB entry as the $0^{th}$ guest index. Accordingly, in the second example embodiment, exemplary TLB entry 7 may correspond to Root Index/Entry 0 610-0, while exemplary TLB entry 0 may correspond to Guest Index/Entry 0 620-0.

Accordingly, in some embodiments, Private VTLB 225 (FIG. 2) may include a first set of logically contiguous entry locations with a plurality of subsets where each subset may include logically contiguous entry locations for exclusive use of a corresponding virtual processing element (VPE) in a plurality of available VPEs. For example, if the logically contiguous entries in Private VTLB 600 correspond to Private VTLB 230-0 (FIG. 2) then, Private VTLB 600 may be accessed exclusively by VPE 240-0. Further, each subset (e.g. VTLB 230-0, 230-1 . . . ) of entry locations may include a first group of logically contiguous entries for the exclusive use of a root process associated with a VPE (e.g. 240-0, 240-1 . . . ) corresponding to the subset. For example, Private VTLB 600 may include root wired entries 615. Each subset (e.g. VTLB 230-0, 230-1 . . . ) of entry locations may also include a second group of logically contiguous entries for the exclusive use of a guest process associated with a VPE (e.g. 240-0, 240-1 . . . ) corresponding to the subset. For example, Private VTLB 600 may include guest wired entries 625. Further, each subset (e.g. VTLB 230-0, 230-1 . . . ) of entry locations may include a third group of logically contiguous entries shared between a root process and guest process associated with a VPE (e.g. 240-0, 240-1 . . . ) corresponding to the subset. For example, Private VTLB 600, which may be exclusive to a VPE, may include Shared Private VTLB 640, which may be shared between a root and guest process associated with the VPE.

Further, as shown in FIG. 6, the logically contiguous entries in each subset (e.g. Private VTLB 600) may be numbered sequentially and the first group of logically contiguous entries may allocated to the root process by mapping, in sequential ascending order, a lowest numbered TLB entry in the first subset to a lowest numbered entry index used by the root process to address the TLB entry. For example, lowest numbered TLB Entry numbers 0 and 1 may be mapped to lowest numbered root indexes—Root Index 0 610-0 and Root Index 1 610-1, respectively. Further, the second group of logically contiguous entries may be allocated to the guest process by mapping, in sequential descending order, a highest numbered TLB entry in the first subset to a lowest numbered entry index used by the guest process to address the TLB entry. For example, highest numbered TLB Entry numbers 7 and 6 may be mapped to lowest numbered guest indexes—Guest Index 0 620-0 and Guest Index 1 620-1, respectively. Any remaining entries (which may constitute a third group of logically contiguous entries) may be shared between root and guest as indicated by Shared Private VTLB 640. Shared entries in Shared Private VTLB 640 may be managed in accordance with a replacement policy associated with the VPE managing Private VTLB 600.

Note that the description and allocation of entries above is merely exemplary and other schemes are envisaged. For example, in another embodiment, the logically contiguous entries in each subset (e.g. Private VTLB 600) may be numbered sequentially and the first group of logically contiguous entries may allocated to the root process by mapping, in sequential descending order, a highest numbered TLB entry in the first subset to a lowest numbered entry index used by the root process to address the TLB entry. For example, highest numbered TLB Entry numbers 7 and 6 may be mapped to lowest numbered root indexes—Root Index 610-0 and Root Index 1 610-1, respectively. Further, the second group of logically contiguous entries may be allocated to the guest process by mapping, in sequential ascending order, a lowest numbered TLB entry in the first subset to a lowest numbered entry index used by the guest process to address the TLB entry. For example, lowest numbered TLB Entry numbers 0 and 1 may be mapped to lowest numbered guest indexes—Guest Index 0 620-0 and Guest Index 1 620-1, respectively. Any remaining entries (which may constitute a third group of logically contiguous entries) may be shared between root and guest as indicated by Shared Private VTLB 640. Shared entries in Shared Private VTLB 640 may be managed in accordance with a replacement policy associated with the VPE managing Private VTLB 600.

Figure 7:
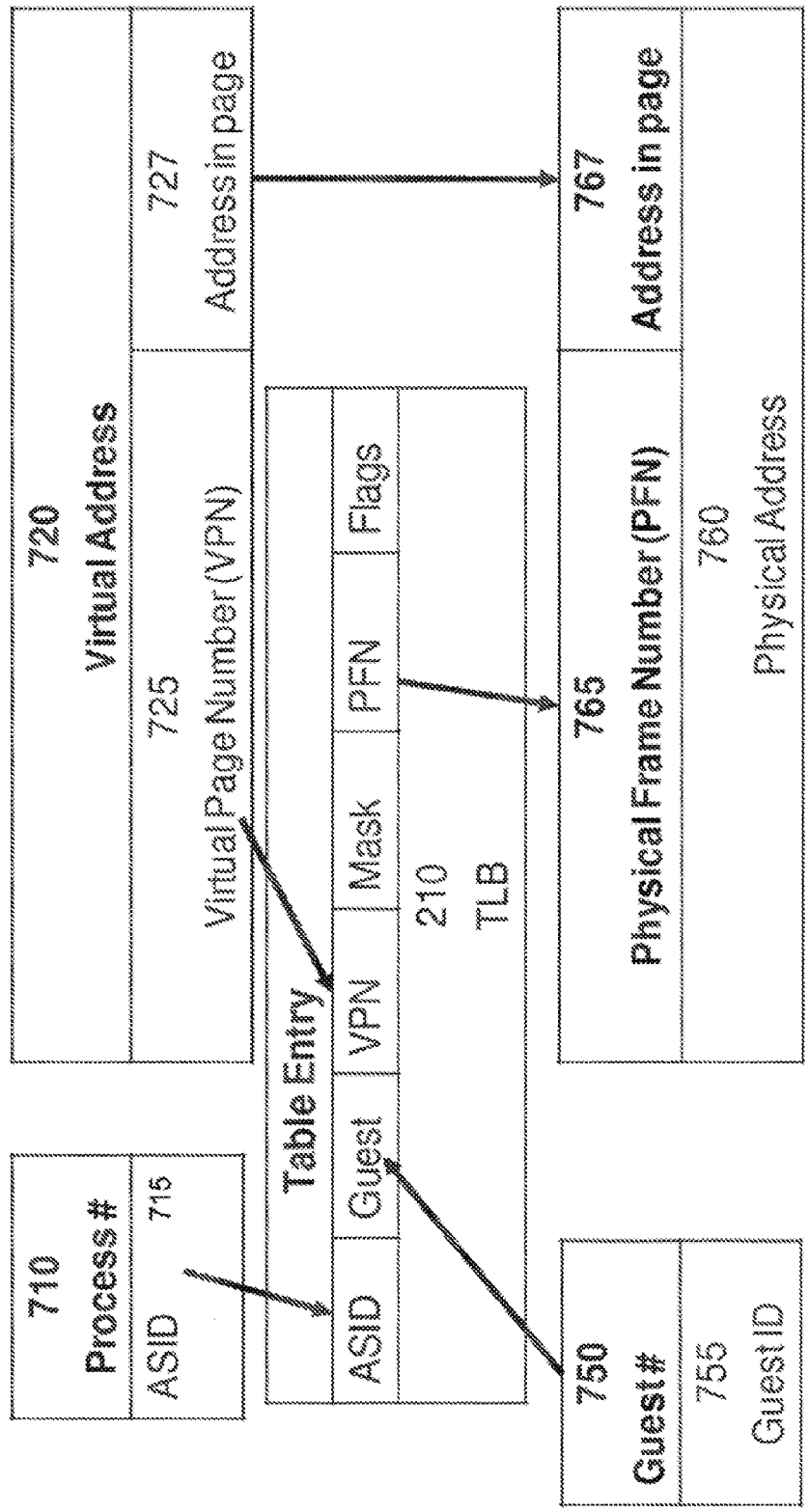
FIG. 7 shows a block diagram illustrating the translation of a Virtual Address to a Physical Address in a manner consistent with disclosed embodiments.

FIG. 7 shows a block diagram 700 illustrating the translation of a Virtual Address to a Physical Address in a manner consistent with disclosed embodiments. In some embodiments, a virtual address 720 may include Virtual Page Number (VPN) 725 and an address (or offset) within the page 727. Virtual Address 720 may be combined with Address Space Identifier (ASID) 715, which is process specific. For example, each process 710 may have a separate address space, which may be assigned unique ASID 715. Address Space Identifier (ASID), ASID 715 may be stored with each TLB entry to distinguish between page table entries loaded for different processes. ASIDs facilitate processor context switching without altering TLB entries. For example, ASIDs may facilitate entries with from different process address spaces but with the same VPN to coexist in the TLB. Further, Virtual Address 720 may also be combined with Guest Identifier (Guest ID) 755, which, in virtualized environments, may uniquely identify each guest (e.g. running on a VPE).

In some embodiments, when a TLB entry 210 is written, an identifier associated with the guest may be saved in to the Guest ID field 755 of TLB entry 210. For example, in some embodiments, when a guest operating system writes a guest TLB entry 210, processor circuitry/hardware may be configured to write to the Guest ID field 755 of TLB entry 210 without the guest explicitly specifying the contents written to Guest ID field 755. Further, as another example, when the root writes a root TLB entry on behalf of a guest, an identifier associated with the guest may be written by processor circuitry/hardware to Guest ID field 755 of TLB entry 210. In some embodiments, when the root writes a TLB entry 210 for use by the root, a value of 0 (zero) may be written to Guest ID field 755 to identify the entry as associated with the root. In some embodiments, a CPU register, which may be dedicated, may hold the Guest ID associated with a currently running guest. The register holding the current Guest ID may facilitate writing of the Guest ID to the Guest ID field 755 of TLB entry 210 by processor circuitry/hardware. When a translation front Virtual Address 720 to Physical Address 760 is performed, the current Guest ID in Guest ID field 755 is passed along with. Virtual Address 720 to the lookup logic. In addition, in some embodiments, a Root/Guest flag indicating whether a guest or root is running is passed to the lookup logic. In some embodiments, the lookup logic may signal a match when it detects a match for virtual page number (VPN) 725, Guest ID 755, and the Root/Guest flag with corresponding subfields of a TLB entry. The resulting Physical Frame Number (PFN) 765 may be combined with page offset or address in page 727 to obtain Physical Address 760.

In some embodiments, Virtual Address 720, Guest ID 755, Root/Guest flag and an identifier associated with the VPE may be sent to the lookup logic in VTLB 225 and FTLB 210 simultaneously. In some embodiments, all entries in VTLB 205, which may be a CAM, can be looked up in parallel. If an entry in VTLB 205 matches the input, Physical Address 760 corresponding to the input to VTLB 205 is output. In parallel, a portion of the bits in Virtual Address 720 may be used as index to lookup FTLB 210, which may be set associative, and all ways of that set are read out. If there is a match, Physical Address 760 corresponding to the input to FTLB 210 is output. Because TLB entries are unique, a single match may occur either in VTLB 205 or in FTLB 210 but not both. Physical Address 760 may be used to retrieve the desired data. Accordingly, in some disclosed embodiments, the TLB and/or look up logic associated with the TLB may be capable of simultaneously looking up TLB lookup requests in VTLB 225, which may include a content addressable memory with variable page size entries, and FTLB 210, which may include a set associative memory with fixed page size entries.

ASID 710, Guest ID 755, VPN 725 and a mask may be used by MMU 180 to generate TLB lookup request 215 to look up TLB 210 and obtain TLB lookup result 255, which may include Physical Frame Number (PFN) 765. PFN 765 may be combined with the offset or address with page 727 to obtain Physical Address 760. Flags may indicate the state of a TLB entry. In some embodiments, in addition to the Root/Guest flag, the Flags field associated with a TLB entry may indicate page attributes including whether a page is valid/invalid, writable/non-writable, readable/non-readable or executable/non-executable.

In some implementations, the term "module" may indicate circuitry that implements a function or functions attributed to that module. The term "circuitry" does not imply a single electrically connected set of elements or circuits, or that circuitry for implementing a particular function must be specific or assigned solely to performing that function. For example, circuitry may be fixed function, configurable, or programmable. In general, circuitry implementing a functional unit may be configurable, or may be more configurable than specifically assigned circuitry. For example, an address decoder, MMU, or other units of a processor may use the same portion of circuitry in a variety of ways when performing different operations. As such, that portion of circuitry is effectively circuitry, or part of circuitry, for each different operation, when configured to perform or otherwise interconnected to perform each of the different operations. Such configuration may come from or be based on instructions, microcode, or state data, for example. For the various modules disclosed herein, circuitry implementing process(es) or function(s) disclosed with respect to those modules provides a means for performing such process(es) or function(s).

Different approaches to design of circuitry exist, for example, circuitry may be synchronous or asynchronous with respect to a clock. Circuitry may be designed to be static or be dynamic. In general, different circuit design approaches may be used to implement different functional units or parts thereof. Absent some context-specific basis, "circuitry" encompasses all such design approaches. Although circuitry or functional units described herein may be most frequently implemented by electrical circuitry, and more particularly, by circuitry that primarily relies on a transistor implemented in a semiconductor as a primary switch element, this term is to be understood in relation to the technology being disclosed. For example, different physical processes or technologies may be used in circuitry implementing a given functional module, such as optical, nanotubes, micro-electrical mechanical elements, quantum switches or memory storage, magnetoresistive logic elements, and so on. Although a choice of technology used to construct circuitry or functional units according to the technology may change over time, this choice is an implementation decision to be made in accordance with a then-current state of technology Further, although the description includes illustrative examples in connection with specific embodiments, the disclosure is not limited thereto. Various adaptations and modifications may be made without departing from the scope. Therefore, the spirit and scope of the appended claims should not be limited to the foregoing description.

What is claimed is:

1. A physical Translation Lookaside Buffer (TLB) comprising: a physical content addressable memory, wherein the content addressable memory comprises a first set of entry locations, wherein each entry location in the first set is usable by one or more of a plurality of available virtual processing elements (VPEs), a first group of entries of said entry locations being allocated to a root process associated with a corresponding VPE by mapping, in sequential ascending order, a lowest numbered TLB entry in the first set to a lowest numbered entry index used by the root process to address the TLB entry; and
   a physical set associative memory, the set associative memory comprising a second set of entry locations distinct from the first set of entry locations, wherein the second set of entry locations is shared among the available VPEs.

2. The TLB of claim 1, wherein the TLB is capable of simultaneously looking up TLB lookup requests in the content addressable memory and the set associative memory.

3. The TLB of claim 1, wherein the first set of entry locations comprises a plurality of subsets, each subset of entry locations comprising:

a first group of entries for the exclusive use of a corresponding root process associated with a VPE corresponding to the subset.

4. The TLB of claim 3, wherein each subset of entry locations further comprises: a second group of entries, distinct from the first group of entries, for the exclusive use of a guest process running on the VPE corresponding to the subset.

5. The TLB of claim 4, wherein each subset of entry locations further comprises:
   a third group of entries, distinct from the first and second groups, wherein the third group is shared between the root process and the guest process.

6. The TLB of claim 4, wherein:
   the entries in each subset are numbered sequentially;
   and the second group of entries is allocated to the guest process by mapping, in sequential descending order, a highest numbered TLB entry in the first subset to a lowest numbered entry index used by the guest process to address the TLB entry.

7. The TLB of claim 5, wherein: entries in the third group are managed in accordance with a replacement policy associated with the VPE corresponding to the subset.

8. A physical Translation Lookaside Buffer (TLB) comprising:
   a physical content addressable memory, wherein the content addressable memory comprises a first set of entry locations, wherein each entry location in the first set is usable by one or more of a plurality of available virtual processing elements (VPEs), and a physical set associative memory, the set associative memory comprising a second set of entry locations distinct from the first set of entry locations, wherein the second set of entry locations is shared among the available VPEs, wherein:
   the entries are numbered sequentially,
   a first group of entries being allocated to the root process by mapping, in sequential descending order, a highest numbered TLB entry in the entry locations to a lowest numbered entry index used by the root process to address the TLB entry; and
   a second group of entries being allocated to the guest process by mapping, in sequential ascending order, a lowest numbered TLB entry in the entry locations to a lowest numbered entry index used by the guest process to address the TLB entry.

9. A processor configurable to support a plurality of available Virtual Processing Elements (VPEs), the processor comprising a Memory Management Unit (MMU), wherein the MMU comprises:
   a physical Translation Lookaside Buffer (TLB) comprising:
   a physical content addressable memory, wherein the content addressable memory comprises a first set of entry locations, wherein each entry location in the first set is usable by one or more of a plurality of available virtual processing elements (VPEs), a first group of entries being allocated to a root process associated with a corresponding VPE by mapping, in sequential ascending order, a lowest numbered TLB entry in the entry locations to a lowest numbered entry index used by the root process to address the TLB entry; and
   a physical set associative memory, the set associative memory comprising a second set of entry locations distinct from the first set of entry locations, wherein the second set of entry locations is shared among the available VPEs.

10. The processor of claim 9, wherein the TLB is capable of simultaneously looking up TLB lookup requests in the content addressable memory and the set associative memory.

11. The processor of claim 9, wherein the first set of entry locations comprises a plurality of subsets, each subset of entry locations comprising:

a first group of entries for the exclusive use of a corresponding root process associated with a VPE corresponding to the subset.

12. The processor of claim 11, wherein each subset of entry locations further comprises: a second group of entries, distinct from the first group of entries, for the exclusive use of a guest process running on the VPE corresponding to the subset.

13. The processor of claim 12, wherein each subset of entry locations further comprises: a third group of entries, distinct from the first and second groups, wherein the third group is shared between the root process and the guest process.

14. The processor of claim 12, wherein: the entries in each subset are numbered sequentially;

and the second group of entries is allocated to the guest process by mapping, in sequential descending order, a highest numbered TLB entry in the first subset to a lowest numbered entry index used by the guest process to address the TLB entry.

15. A processor configurable to support a plurality of available Virtual Processing Elements (VPEs), the processor comprising a Memory Management Unit (MMU), wherein the MMU comprises:

a physical Translation Lookaside Buffer (TLB) comprising:

a physical content addressable memory, wherein the content addressable memory comprises a first set of entry locations, wherein each entry location in the first set is usable by one or more of a plurality of available virtual processing elements (VPEs); and a physical set associative memory, the set associative memory comprising a second set of entry locations distinct from the first set of entry locations, wherein the second set of entry locations is shared among the available VPEs; the first set of entry locations comprises a plurality of subsets, the entries in each subset being numbered sequentially; a first group of entries is allocated to the root process by mapping, in sequential descending order, a highest numbered TLB entry in a first subset to a lowest numbered entry index used by the root process to address the TLB entry; and a second group of entries is allocated to the guest process by mapping, in sequential ascending order, a lowest numbered TLB entry in the first subset to a lowest numbered entry index used by the guest process to address the TLB entry.

16. The processor of claim 13, wherein: entries in the third group are managed in accordance with a replacement policy associated with the VPE corresponding to the subset.

* * * * *